(12) United States Patent
Regli et al.

(10) Patent No.: US 9,596,125 B2
(45) Date of Patent: Mar. 14, 2017

(54) EFFICIENT DISTRIBUTED ALGORITHM FOR THE LOCATION DESIGN AND ROUTING PROBLEM

(71) Applicant: Drexel University, Philadelphia, PA (US)

(72) Inventors: William C. Regli, Philadelphia, PA (US); Ali Shokoufandeh, New Hope, PA (US); Evan A. Sultanik, Philadelphia, PA (US)

(73) Assignee: Drexel University, Philadelphia, PA (US)

( * ) Notice: Subject to any disclaimer, the term of this patent is extended or adjusted under 35 U.S.C. 154(b) by 0 days.

(21) Appl. No.: 14/243,952

(22) Filed: Apr. 3, 2014

(65) Prior Publication Data

US 2014/0351398 A1 Nov. 27, 2014

Related U.S. Application Data

(63) Continuation of application No. 13/049,559, filed on Mar. 16, 2011, now abandoned.

(Continued)

(51) Int. Cl.
*G06F 15/173* (2006.01)
*H04L 12/24* (2006.01)
(Continued)

(52) U.S. Cl.
CPC ............. *H04L 41/04* (2013.01); *H04L 45/44* (2013.01); *H04L 67/12* (2013.01)

(58) Field of Classification Search
CPC . H04L 41/08; H04L 41/0803; H04L 41/0806; H04L 41/12; H04L 41/14; H04L 41/142; H04L 41/145
(Continued)

(56) References Cited

U.S. PATENT DOCUMENTS 7,929,460 B2 * 4/2011 Chen ..................... H04W 16/12
370/255
7,949,739 B2 * 5/2011 Florissi et al. ................ 709/223
(Continued)

OTHER PUBLICATIONS

Cole et al, "Finding Minimum Spanning Forests in Logarithmic Time Aud Linear Work Abstract Using Random Sampling", Proceedings of the Eighth Annual ACM Symposium on Parallel Algorithms and Architectures, New York, NY, ACM, 1996, 243-250.

(Continued)

*Primary Examiner* — Dhairya A Patel
(74) *Attorney, Agent, or Firm* — Baker & Hostetler LLP

(57) ABSTRACT

The Location Design and Routing problem asks to find a subset of "depot" nodes and a spanning forest of a graph such that every connected component in the forest contains at least one depot. This problem arises in a number of both logistical and computer networking problems, for example, in selecting the number and location of distribution centers in vehicle routing networks. This problem is functionally equivalent to that of supernode selection in peer-to-peer networks. A distributed algorithm approximates a solution to this problem that runs in a logarithmic number of communication rounds with respect to the number of nodes (independent of the topology of the network), and, under assumptions on the embedding of the edge weights, whose solutions are within a factor of 2 of optimal.

12 Claims, 3 Drawing Sheets

Related U.S. Application Data

(60) Provisional application No. 61/314,417, filed on Mar. 16, 2010.

(51) Int. Cl.
*H04L 29/08* (2006.01)
*H04L 12/721* (2013.01)

(58) Field of Classification Search
USPC .......................................................... 709/222
See application file for complete search history.

(56) References Cited

U.S. PATENT DOCUMENTS

| | | | | |
|---|---|---|---|---|
| 8,463,881 | B1* | 6/2013 | Baker | H04L 29/06 709/220 |
| 8,806,016 | B2* | 8/2014 | Schreter | H04L 29/12292 709/223 |
| 2006/0153100 | A1* | 7/2006 | Dube et al. | 370/256 |
| 2008/0005334 | A1* | 1/2008 | Utard | G06F 11/1076 709/226 |
| 2009/0262664 | A1* | 10/2009 | Leighton | H04L 41/12 370/254 |
| 2010/0214957 | A1* | 8/2010 | De Carvalho Resende et al. | 370/255 |
| 2011/0302127 | A1* | 12/2011 | Leighton et al. | 706/52 |

OTHER PUBLICATIONS

Correa, et a., "A Parallel Implementation of an Asynchronous Team to the Point-to-Point Connection Problem", Paralell Computing, May 2002, vol. 29(4), 447-466.

Frazzoli, et al., "Decentralized Algorithms for Vehicle Routing in a Stochastic Time-Varying Environment,'" in Proceedings of the 43rd IEEE Conference on Decision and Control, 4, Dec. 2004, 3357-3363.

Goemans, et al., "A General Approximation Technique for Constrained Forest Problems", SIAM Journal on Computing, vol. 24, 1995, 296-317.

Golden, et al., Vehicle Routing: Methods and Studies, Elsevier, vol. 16, 1988, 163-197.

Grandoni et al, "Primal-Dual Based Distributed Algorithms for Vertex Cover With Semi-Hard Capacities,'" in Proceedings of the twenty-fourth annual ACM Symposium on Principles of Distributed Computing, Jul. 2005, 118-125.

Halperin, S. and Zwick, U., "Optimal Randomized EREW PRAM Algorithms for Finding Spanning Forests", Proceedings of the 7th Annual ACM-SIAM Symposium on Discrete Algorithms, Apr. 13, 1998, 35 pages.

Khuller et al, "A Primal-Dual Parallel Approximation Technique Applied to Weighted Set and vertex cover," Journal of Algorithms, 17(2), Oct. 1994, 280-289.

Laporte, "Location-Routing Problems: An Exact Algorithm for Solving a Capacitated Location-Routing Problem", Annals of Operation Research, vol. 6, 1986, 293-310.

Lo et al, "Scalable Supernode Selection in Peer-to-Peer Overlay Networks," in Proceedings of the Second International Workshop on Hot Topics in Peer-to-Peer Systems, Washington, DC, USA: IEEE Computer Society, 2005, 18-27.

Melechovsky, "A Metaheuristic to Solve a Location-Routing Problem with Non-Linear Costs", Journal of Heuristics, Dec. 2005, 11(Issue 5-6), 375-391.

Panconesi, et al., "Fast Distributed Scheduling Via Primal-Dual", Proceedings of the Twentieth Annual Symposium on Parallelism in Algorithms and Architectures, ACM, 2008, 229-235.

Panconesi, et al., "Fast Distributed Scheduling Via Primal-Dual (Extended Abstract)", Springer, 2007, vol. 4474, 1-6.

Peysakhov, et al. "An Ecological Approach to Agent Population Management", Proceedings of the Twentieth National Conference on Artificial Intelligence, 2005, 146-151.

Santos et al, "A Distributed Primal-Dual Heuristic for Steiner Problems in Networks", Springer, 2007, vol. 4525 pp. 175-188.

\* cited by examiner

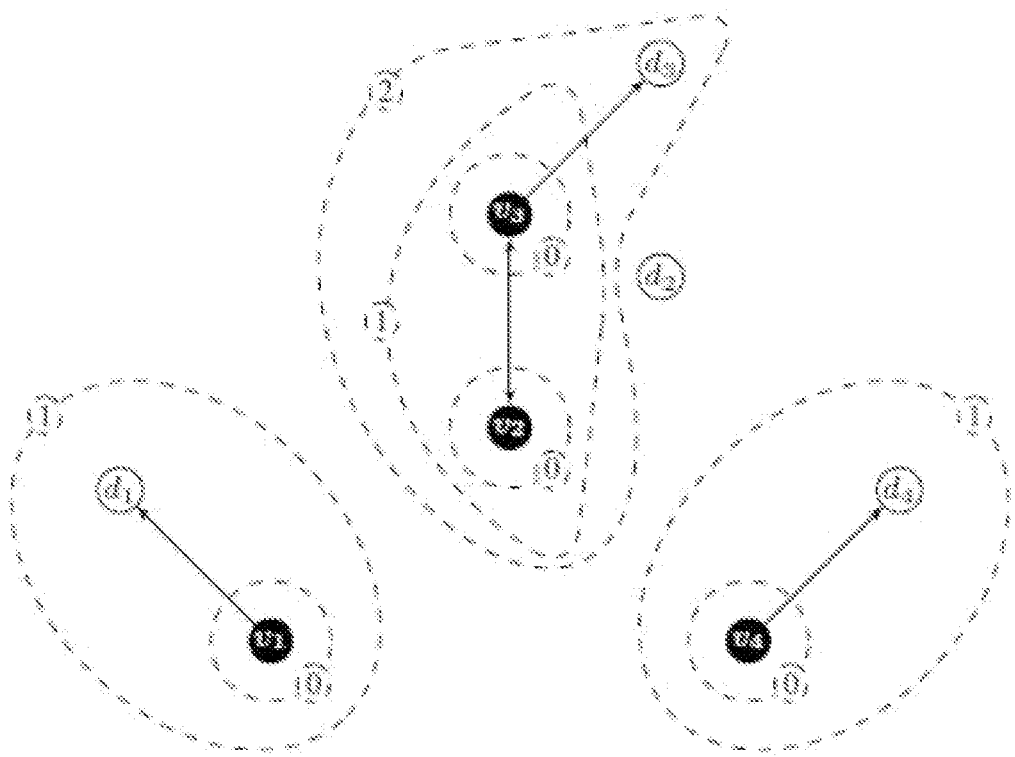

$$t=0\begin{cases}\forall S\subset V:y_S=0\\C_o=\{\{v_1\},\{v_2\},\{v_3\},\{v_4\},\{d_1\},\{d_2\},\{d_3\},\{d_4\}\}\\\forall i\in\{1,2,3,4\}:b_o(v_i)=b_o(d_i)=0\end{cases}$$

$$t=1\begin{cases}J_1(v_1,d_1)=J_1(v_2,v_3)=J_1(v_3,v_2)=J_1(v_4,d_4)=1\\b_1(v_1)=b_1(v_4)=b_1(v_2)=b_1(v_3)=100\\y_{\{v_1\}}=y_{\{v_4\}}=100, y_{\{v_2\}}=y_{\{v_3\}}=50\\C_1=\{\{v_1,d_1\},\{v_2,v_3\},\{v_4,d_4\},\{d_2\},\{d_3\}\}\end{cases}$$

$$t=2\begin{cases}J_2(v_3,d_3)=1\\y\{v_2,v_3\}=100\\C_2\{\{v_1,d_1\},\{v_2,v_3,d_3\},\{v_4,d_4\},\{d_2\}\}\end{cases}$$

$\tau=2$ because every $C\in C_2$ contains a depot.

Figure 3

EFFICIENT DISTRIBUTED ALGORITHM FOR THE LOCATION DESIGN AND ROUTING PROBLEM

CROSS REFERENCE TO RELATED APPLICATIONS

This application is a Continuation of U.S. patent application Ser. No. 13/049,559 filed Mar. 16, 2011, which claims benefit of Provisional Application No. 61/314,417 filed Mar. 16, 2010.

GOVERNMENT SUPPORT

This invention was made with government support under Grant No. N00014-08-1-0925 awarded by the Office of Naval Research and under Grant No. DAAB07-01-9-L504 awarded by the U.S. Army CERDEC. The government has certain rights in the invention.

TECHNICAL FIELD

The invention is in the field of computer processing and, more particularly, the invention provides a distributed computer-implemented solution to the location design and routing problem for the creation of an optimized distribution network for product delivery, electronic communications networks, sensor networks, peer-based grid computing, and the like.

BACKGROUND

The Location Design and Routing problem asks one to find a subset of "depot" nodes and a spanning forest of a graph such that every connected component in the forest contains at least one depot. See G. Laporte, "Location-routing problems," in *Vehicle Routing: Methods and Studies*, B. L. Golden, and A. A. Assad, Eds. Elsevier, 1988, pp. 163-197. A typical scenario takes the form of creating an optimal distribution network. Given a network of roads, how many distribution centers need be built—and in which locations—such that deliveries can be carried out as quickly as possible? What if the cost of building distribution centers is nonuniform with respect to location? Scenarios are not strictly limited to logistical domains; in computer networking and multiagent systems, for example, the unavailability of a central server/database necessitates data redundancy in the system. See M. Peysakhov, R. N. Lass, W. C. Regli, and M. Kam, "An ecological approach to agent population management," in *Proceedings of the Twentieth National Conference on Artificial Intelligence*, 2005, pp. 146-151. Many peer-to-peer systems, such as service oriented architectures and distributed hash tables, promote certain nodes to be supernodes. In this setting, the supernodes are akin to the depots in the location design and routing problem. The problem of selecting which subset of peers should perform a certain role such that they are well dispersed in the network—what is referred to as the supernode selection problem (V. Lo, D. Zhou, Y. Liu, C. Gauthier-Dickey, and J. Li, "Scalable supernode selection in peer-to-peer overlay networks," in *Proceedings of the Second International Workshop on Hot Topics in Peer-to-Peer Systems*, Washington, D.C., USA: IEEE Computer Society, 2005, pp. 18-27) is therefore equivalent to the location design and routing problem. Such problems also appear in the fields of sensor networks and peer-based grid computing.

FIG. 1 provides an example of a weighted distribution network (FIG. 1(a)), along with two optimal solutions, FIGS. 1(b) and 1(c), depending on the cost of opening a depot. In general, finding a set of depots and a spanning forest of minimal weight is NP-Hard (J. Melechovský, C. Prins, and R. W. Calvo, "A metaheuristic to solve a location-routing problem with non-linear costs," *Journal of Heuristics*, vol. 11, no. 5-6, pp. 375-391, 2005).

The sequential variant of the Location Design and Routing problem has been thoroughly studied in the literature (See, e.g., M. X. Goemans and D. P. Williamson, "A general approximation technique for constrained forest problems," *SIAM Journal on Computing*, vol. 24, pp. 296-317, 1995), culminating in the discovery that the problem submits to bounded approximation in polynomial time. There are, therefore, three primary motivations for developing a distributed approximated solution to the problem:

1. The problem itself is naturally distributed—there may not be an obvious central node in which to perform the desirable optimizations;
2. Local properties of the underlying networks seem to allow for speedups from distributed processing; and
3. In certain environments, such as sensor networks, hardware restrictions might necessitate decentralization in order to save memory and computational resources.

Although there is very little in the literature on the parallelization and distribution of this specific problem, the related problem of finding a minimum spanning forest has been widely studied and are known to be soluble in logarithmic time with a linear number of processors. (See S. Halperin and U. Zwick, "Optimal randomized EREW PRAM algorithms for finding spanning forests and for other basic graph connectivity problems," in *Proceedings of the Seventh Annual ACM-SIAM Symposium on Discrete Algorithms*. Philadelphia, Pa., USA: Society for Industrial and Applied Mathematics, 1996, pp. 438-447, and R. Cole, P. N. Klein, and R. E. Tarjan, "Finding minimum spanning forests in logarithmic time and linear work using random sampling," in *Proceedings of the Eighth Annual ACM Symposium on Parallel Algorithms and Architectures*, New York, N.Y., USA: ACM, 1996, pp. 243-250.) In fact, finding a minimum spanning forest is a special case of the location design and routing problem in which depot opening costs are very large (i.e., greater than the diameter of the graph). To the best of the inventors' knowledge, however, the converse is not true: There is no known trivial reduction from the location design and routing problem to the spanning forest problem.

Proposing distributed algorithms using the primal/dual schema has also been the subject of study of a number of recent results. See A. Panconesi, Fast Distributed Algorithms Via Primal-Dual (Extended Abstract), Heidelberg: Springer, 2007, vol. 4474/2007, pp. 1-6. Problems that have been studied using this schema include Steiner problems (M. Santos, L. M. A. Drummond, and E. Uchoa, A Distributed Primal-Dual Heuristic for Steiner Problems in Networks, Springer, 2007, vol. 4525/2007, pp. 175-188), point-to-point connectivity problems (R. C. Corrêa, F. C. Gomes, C. A. S. Oliveira, and P. M. Pardalos, "A parallel implementation of an asynchronous team to the point-to-point connection problem," *Parallel Computing*, vol. 29, no. 4, pp. 447-466, 05/2002 2002), distributed scheduling (A. Panconesi and M. Sozio, "Fast distributed scheduling via primal-dual," in *Proceedings of the twentieth annual symposium on Parallelism in algorithms and architectures*, ACM. Munich, Germany: ACM, 2008, pp. 229-235), vertex cover (S. Khuller, U. Vishkin, and N. Young, "A primal-dual parallel approximation technique applied to weighted set and vertex cover," *Journal of Algorithms*, vol. 17, no. 2, pp. 280-289, October 1994; and F. Grandoni, J. Könemann, A. Panconesi, and M. Sozio, "Primal-dual based distributed algorithms for vertex cover with semi-hard capacities," in *Proceedings of the twenty-fourth annual ACM symposium on Principles of distributed computing*, Las Vegas, Nev., USA, 2005, pp. 118-125), and facility location (M. Sozio, "Efficient distributed algorithms via the primal-dual schema," Ph. D. Dissertation, "La Sapienza" University, Rome, September 2006). Control theoretic approaches have also been used to solve stochastic variants of the vehicle routing problem (E. Frazzoli and F. Bullo, "Decentralized algorithms for vehicle routing in a stochastic time-varying environment," in *Proceedings of the 43rd IEEE Conference on Decision and Control*, vol. 4, December 2004, pp. 3357-3363).

To the best of the inventors' knowledge, however, there is no prior result which theoretically proves a constant bound on the cost of the optimal solution and provides a polylogarithmic bound on the number of communication rounds for the optimization problem. Algorithms for addressing this problem, including a bounded distributed version of an approximation algorithm for the location design and routing problem that runs in a logarithmic number of communication rounds with respect to the number of nodes, is desired and will be described herein.

SUMMARY OF THE INVENTION

A bounded distributed version of an approximation algorithm for the location design and routing problem that runs in a logarithmic number of communication rounds with respect to the number of nodes (independent of the topology of the network), and whose solutions are within a factor of 2 of optimal under certain assumptions about the distribution of the edge weights in the graph is disclosed. An algorithm and its parallel version for solving the distributed location design and routing problem and a mapping of the problem to an equivalent connectivity problem, as well as techniques for distributing the parallel algorithm in an asynchronous network, are also disclosed.

In an exemplary embodiment, a computer system is programmed by executable instructions to implement a method of identifying nodes or distribution centers for distributing information or materials throughout a network or throughout a geographic area. In the exemplary embodiment, the executable instructions when processed by a processor of the computer implement the steps of:

(a) starting with an empty forest of potential nodes or distribution centers of the network or the geographic area, assigning each potential node or distribution center of the forest to be a member of its own connected component;

(b) for each potential node or distribution center that has not yet been assigned to be a node or distribution center, adding a cut edge of a connected component to the forest and merging the cut edge with a potential node or distribution center on the other end of the cut edge;

(c) when a potential node or distribution center is merged with another potential node or distribution center that has been assigned to a node or distribution center, assigning the same node or distribution center to the potential node or distribution center and stopping a resulting merged node from actively growing; and (d) repeating steps (a)-(c) until all potential nodes or distribution centers have been assigned to a node or distribution center.

The computer may be further programmed by executable instructions to proceed asynchronously between respective connected components of the forest of potential nodes or distribution centers. Also, the cut edges of the connected components may have different weights.

The scope of the invention further encompasses a computer readable medium containing the executable instructions for implementing the claimed method.

BRIEF DESCRIPTION OF THE DRAWINGS

The foregoing and other beneficial features and advantages of the invention will become apparent from the following detailed description in connection with the attached figures, of which:

FIG. 3 illustrates a snapshot of the algorithm solving the augmented distribution network problem of FIG. 2(a).

DETAILED DESCRIPTION OF ILLUSTRATIVE EMBODIMENTS

Figure 1:
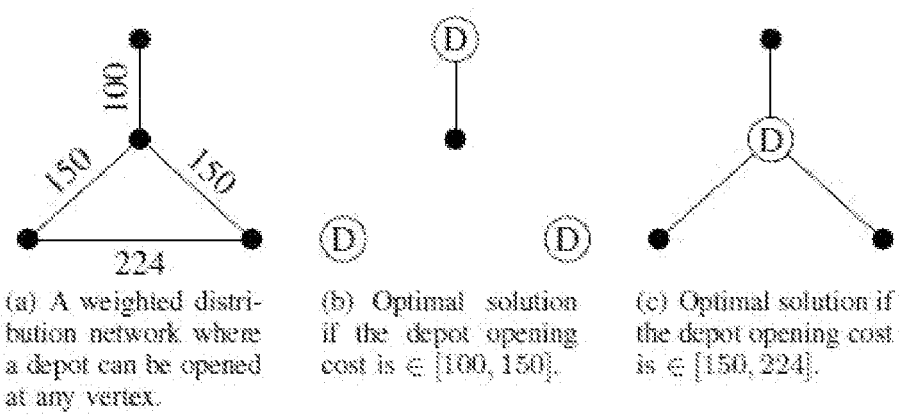
FIG. 1 illustrates an example of a weighted distribution network, Figure (a), along with the optimal spanning forest and depot assignment for various depot opening costs, FIG. 1(b) and FIG. 1(c).
Figure 2:
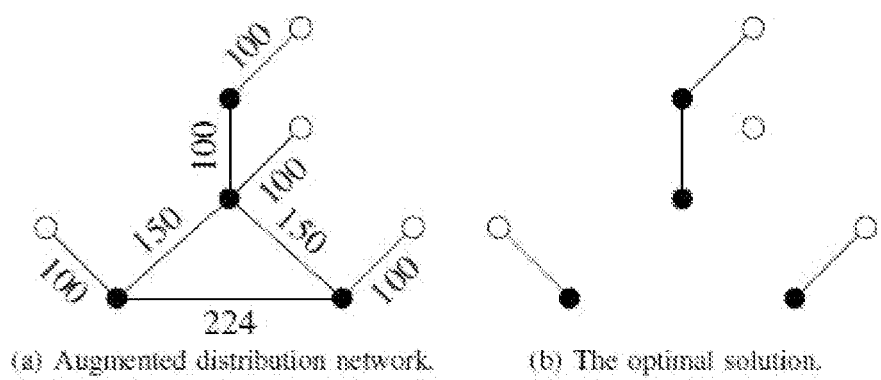
FIG. 2(a) provides the augmented graph corresponding to the distribution network in FIG. 1(a) with a uniform depot opening cost of 100.
FIG. 2(b) is the optimal solution to the augmented network, corresponding to the solution in FIG. 1(b).

The present invention may be understood more readily by reference to the following detailed description taken in connection with the accompanying figures and examples, which form a part of this disclosure. It is to be understood that this invention is not limited to the specific products, methods, conditions or parameters described and/or shown herein, and that the terminology used herein is for the purpose of describing particular embodiments by way of example only and is not intended to be limiting of any claimed invention. Similarly, any description as to a possible mechanism or mode of action or reason for improvement is meant to be illustrative only, and the invention herein is not to be constrained by the correctness or incorrectness of any such suggested mechanism or mode of action or reason for improvement. Throughout this text, it is recognized that the descriptions refer both to methods and software for implementing such methods.

A detailed description of illustrative embodiments of the present invention will now be described with reference to FIGS. 1-4. Although this description provides a detailed example of possible implementations of the present invention, it should be noted that these details are intended to be exemplary and in no way delimit the scope of the invention.

The Location Design and Routing Problem

Given a graph $G = \langle V, E \rangle$ with both vertex and edge weights $w: V \cup E \rightarrow \mathbb{Q}$, the Location Design and Routing Problem asks one to find a subset of "depot" vertices $D \subseteq V$ and a spanning forest $F \subseteq E$ such that each connected component in F contains at least one depot. The cost of opening a depot at a vertex is modeled using the vertex weights; for example, the cost of opening a depot at vertex $v \in V$ is $w(v)$. Therefore, it is desired to minimize the weight of D and F:

$$\text{minimize } \left(\sum_{d \in D} w(d)\right) + \left(\sum_{e \in F} w(e)\right)$$

subject to:

$(\exists\, d \in D:\ v''\ \text{is connected to}\ d\ \text{in}\ F),\ \forall\, v \in V$ $D \subseteq V,$ $F \subseteq E.$ For sake of analysis, the representation of this optimization problem can be simplified by recasting it as a connectivity problem. Therefore, the graph may be augmented with special depot vertices $d_i$ associated with each original vertex $v_i$. Next, an edge is added from each vertex to its associated depot vertex, weighted with the cost of opening a depot at that vertex. The new overall set of edges is the original set of edges unioned with the set of new depot edges. Let $R=\{v_1, \ldots, v_n\}$ be the set of original (input) vertices and let $T=\{d_1, \ldots, d_n\}$ be the set of new special depot vertices with the new overall set of vertices $V=R \cup T$. A vertex $v_i$ will be a part of D (i.e., it will be chosen to become a depot) if the edge from it to its associated depot vertex is a part of the final spanning forest: $\langle v_i, d_i \rangle \in F \Rightarrow v_i \in D$. The optimization problem can now be rewritten such that it amounts to finding an acyclic subset of the new edges that connects each $v \in R$ to at least one $d \in T$. Since this subset is a forest that spans R, it will hereafter be referred to as "the spanning forest." Note, however, that the spanning forest does not necessarily span all of T. An example of this augmented graph is given in FIG. 2(a), which assumes a uniform opening cost of 100.

Without loss of generality, it may be assumed that w(e) now denotes the edge weights. The new optimization problem on the augmented graph can be captured as the following integer program:

$$\text{minimize } \sum_{e \in E} w(e) x_e$$

subject to:

$x(\delta(S)) \geq |S \cap T|, \quad \forall\, S \subset V: S \neq \emptyset$ $x_e \in \{0, 1\}, \quad \forall\, e \in E,$ where each variable $x_e$ is an indicator as to whether the edge $e$ is a member of the final spanning forest, $\delta(S)$ is the set of edges having exactly one endpoint in S, and $x(F) \mapsto \Sigma\ e \in F^{x_e}$. Therefore, any forest $F \subseteq E$ will be a feasible solution to the problem if every connected component S of the forest has at least one depot. Let LP denote the linear programming relaxation of IP obtained by relaxing the integrality restriction on the variables to $x_e \geq 0$. The dual of LP is:

$$\text{maximize } \sum_{S \subseteq V} \overline{x(S \cap T)} ys$$

Subject to:

$\sum_{S: e \in \delta(S)} y_s \leq w_e, \quad \forall\, e \in E$ $ys \geq 0, \quad \forall\, S \subset V: S \neq 0,$ where x: $X \rightarrow \{0,1\}$ is an indicator function: $x(X) \mapsto 1 \Leftrightarrow X \neq \emptyset$. An edge is tight if $w(e) = \Sigma_{S: e \in \delta(S)} ys$. Let $Z^*_{LP}$ be the cost of the optimal solution to LP and let $Z^*_{IP}$ be the cost of the optimal solution to IP. It is a folklore result that $Z^*_{LP} \leq Z^*_{IP}$.

The Solution

Starting with an empty forest, each vertex is a member of its own connected component. Every round, each depot-less component greedily chooses to add one of its cut edges to the forest, merging with the component on the other end of the edge. When a component merges with another component containing a depot, the new component after the union stops actively growing. When all components contain depots the algorithm terminates. For simplicity, the algorithm is first introduced herein as a parallel algorithm according to the concurrent read exclusive write (CREW) parallel random access machine (PRAM) model. The notation and mathematics required to formally define and model the algorithm are then described. This model will be used below to provide formal bounds on the runtime and performance of the algorithm, and also to prove correctness and completeness. It will also be shown that this same algorithm can be trivially distributed in an asynchronous network.

Let $F_t$ be the partially constructed spanning forest at the beginning of round $t$. Let $C_t$ be the set of connected components in $F_t$. For sake of brevity and simplicity, let $\mu_t: V \rightarrow C_t$ be a function mapping vertices to their associated connected component during round $t$; therefore, $\mu_t(v) \mapsto C_i \Rightarrow v \in C_i \in C_t$. A vertex that is incident to at least one edge in the cut of its connected component is said to be in the frontier. Let $b_t: V \rightarrow \mathbb{R}$ be a mapping of vertices to a real number during round $t$. These values represent the amount of slack remaining in the dual variables associated with a vertex. An example of this notation is given in FIG. 3.

Now, let $J_t: V \times V \rightarrow \{0,1\}$ be a binary relation defining which edges will become tight during round $t$. Each depot-less component will choose to add the edge in its frontier that has minimal weight and dual variable slack. Therefore, $J_t(u, v) = 1$ if and only if $$(\mu_t(u) \cap T = \emptyset) \wedge \left(\langle u, v \rangle = \text{argmin}_{(i,j) \in \delta(\mu_t(u))} w(\langle i, j \rangle) - b_t(i) - b_t(j)\right)$$

It may be assumed that each edge has a unique identifier over which there is a total ordering. Ties in the minimization are broken based upon the ordering of the edges. Let $J^+$ denote the transitive closure of J. Note that J J is not commutative: $J(u, v) \not\Rightarrow J(v, u)$. Also note that as long as there exists a feasible solution to IP then the minimization ensures that each depot-less connected component must have exactly one edge in the frontier that becomes tight each round:

$\forall C \in C_t, \exists (v,u) \in \delta(C): C \cap T = \emptyset \Rightarrow J_t(v,u) = 1.$ $F_t$ is the partially constructed spanning forest during round $t$, initialized to $F_0 = \langle V, \emptyset \rangle$. The forest is updated each round with the set of all edges that became tight during the round:

$F_{t+1} = F_t \cup \{\langle u, v \rangle \in E: J_t(u, v) \vee J_t(v, u)\}$

For a set $S \subseteq V$, let $ys$ be the dual variable associated with $\underline{S}$. Initially, all such variables are set to zero. Note that in actuality these variables need not be made part of an implementation of the algorithm; they exist solely for the purpose of theoretically proving properties of the algorithm. These dual variables are implicitly updated as follows:

$$ys \leftarrow \begin{cases} \dfrac{w(\langle i, j \rangle) - b\_t(i) - b\_t(j)}{1 + J_t(j, i)} & \text{if } \exists\, i \in S \in C_t,\ j \notin S: J_t(i, j), \\ 0 & \text{otherwise} \end{cases} \quad (1)$$

The b values are initialized such that $\forall v \in V: b_o(v)=0$. They are updated each round such that:

$$b_{t+1}(v)=b_t(v)+y_{\mu_t(v)} \quad (2)$$

The value $b_t(v)$ can therefore be interpreted as the amount of slack remaining in the dual variables during round $t$ before an edge incident to vertex $v$ becomes tight.

Let $\tau$ be the number of rounds required for the algorithm to terminate—or, in the case of the distributed algorithm, the number of rounds required to reach quiescence. Therefore, $\tau$ is the earliest round during which there are no components without depots:

$$\tau = \min_{\tau \in \mathbb{N}^*}(\forall C \in C_t : C \cap T \neq \emptyset) \quad (3)$$

The notation is now sufficient to introduce the parallel version of the algorithm, given in Algorithm 1 below. A snapshot of the algorithm's execution for solving the augmented distribution network problem of FIG. 2(a), along with an example of the notation, is given in FIG. 3. Connected components are visualized as dashed regions. The [round]#; labels denote the round number during which a connected component was created. Directions on the edges represent the component that chose to make that edge tight.

---
Algorithm1 The parallel location design and routing algorithm.
---

1: procedure Parallel-Location-Design (G, T, w)
Require: $G = \langle V, E \rangle$ is an undirected graph already augmented with the special depot vertices. $T \subset V$ is the set of "special" depot vertices.

$$w: E \to \left[1, \frac{3}{2}\right] \in \mathbb{Q}$$

is a weight or cost function such that each edge $e \in E$ has an associated cost. $\mu_t: V \to 2^V$ is a convenience function mapping vertices to their connected component in $C_t$.
Ensure: F' is the resulting spanning forest.
2:  $t \leftarrow 0$
3:  $F \leftarrow \emptyset$ /* Implicitly set ys = 0 for all $S \subset V$ */
4:  for all $v \in V$ do in parallel
5:      $S \leftarrow \{v\}$
6:      $\mu_0(v) \leftarrow S$
7:      $C_0 \leftarrow C_0 \cup \{S\}$
8:      $b_o(v) \leftarrow 0$
9:  while $\exists C \in C_t: C \cap T = \emptyset$ do
10:     $t \leftarrow t + 1$
11:     $C_t \leftarrow C_{t-1}$
12:     for all $C \in C_{t-1}$ do in parallel
13:         $I(C) \leftarrow 0$ /* I is a temporary map */
14:         $K(C) \leftarrow \emptyset$ /* K is a temporary map */
15:     for all $C \in \{S \in C_{t-1}: C \cap T = \emptyset\}$ do in parallel
16:         Find an edge $e = \langle u, v \rangle \in \delta(C)$ such that $u \in C$ and $\epsilon = w(e) - b_{t-1}(v) - b_{t-1}(u)$ is minimized.
17:         $F \leftarrow F \cup \{e\}$
18:         $C_t \leftarrow C_t \cup \{\mu_{t-1}(v) \cup \mu_{t-1}(u)\} - \{\mu_{t-1}(v)\} - \{\mu_{t-1}(u)\}$
19:         $\mu_t(u) \leftarrow \mu_{t-1}(v) \cup \mu_{t-1}(u)$
20:         $K(C) \leftarrow \mu_{t-1}(v)$
21:         $I(C) \leftarrow \epsilon$
22:     for all $v \in V$ do in parallel
23:         if $K(K(\mu_{t-1}(v))) = \mu_{t-1}(v)$ then
24:             $I(\mu_{t-1}(v)) \leftarrow \dfrac{I(\mu_{t-1}(v))}{2}$
25:         $b_t(v) \leftarrow b_{t-1}(v) + I(\mu_{t-1}(v))$
26:     $A \leftarrow$ the keys of I sorted by descending $\epsilon$ value. /* Implicitly used for analysis; need not be implemented */
27:     for $i \leftarrow 1$ to $|A|$ do /* Implicit */
28:         for $j \leftarrow 1$ to $i$ do /* Implicit */
29:             $y_{A[j]} \leftarrow y_{A[j]} + I(A[i])$ /* Implicit */

---
Algorithm1 The parallel location design and routing algorithm.
—continued
---

30:     $F' \leftarrow \{e \in F:$ For some connected component N of $\langle V, F - \{e\}\rangle$ it is true that $N \cap T = \emptyset\}$ Analysis The various performance guarantees of Algorithm 1 will now be explained. First, Lemmas 1 and 2 lead to Proposition 1 which implies that the solutions found by the algorithm are acyclic and thereby forests, implying that they are primal feasible. Proposition 2 states that the main loop (line 9 of Algorithm 1) will have a logarithmic number of iterations. Claim 3 leads to Proposition 3 which states that the solutions found by the algorithm are dual feasible. Finally, Lemma 3 leads to Proposition 4 which states that as long as the edge weights are embedded in the proper metric space then the algorithm is a 2-approximation.

Lemma 1: Any cycle in the intersection graph of $F_{t+1}$ formed from $C_t$ must consist solely of edges along the cuts between depot-less components.

Proof:
Assume, on the contrary, that there exists a cycle containing an edge that is incident to at least one component containing a depot. Let $\langle u, v \rangle$ be such an edge and assume $\mu_t(v)$ contains at least one depot. (1) implies that v's connected component has no outgoing edges, $$\forall i \in \mu_t(v): (\neg \exists j \in V: J_t(i,j)),$$

which contradicts the fact that $\langle u, v \rangle$ is in a cycle.

The "Potential Cost" of an edge is the fractional quantity associated with $\in$ on line 16 of Algorithm 1.

Lemma 2: Any cycle in the intersection graph of $F_{t+1}$ formed from $C_t$ must consist of edges of equal potential cost.

Proof:
Let $e_1 = \langle u_1, v_1 \rangle$ be an edge in a cycle. (1) implies that all edges in a cycle must be cuts between existing connected components. Therefore, $\mu_t(u_1) \neq \mu_t(v_1)$. Furthermore, there must be another edge in the cycle, $e_2 = \langle u_2, v_2 \rangle$, such that $\mu_t(v_2) = \mu_t(u_1)$. It must also be true that $J_t(u_1, v_1) = J_t(u_2, v_2) = J_t^+(u_1, v_2) = 1$.

By Lemma 1 there are no depots in any of the components in the cycle. Therefore, applying (1) gives $$w(e_1) - b_t(u_1) - b_t(v_1) \leq w(e_2) - b_t(u_2) - b_t(v_2)$$

In general, this inequality will hold for the incoming and outgoing edges of any connected component in the cycle. Therefore, by transitivity, $$w(e_1) - b_t(u_1) - b_t(v_1) \leq w(e_2) - b_t(u_2) - b_t(v_2) \leq w(e_1) - b_t(u_1) - b_t(v_1),$$

Implying that $$w(e_1) - b_t(u_1) - b_t(v_1) \leq w(e_2) - b_t(u_2) - b_t(v_2).$$

Proposition 1: The intersection graph of $F_{t+1}$ formed from $C_t$ is acyclic.

Proof:
Assume, on the contrary, that there is a round t during which a cycle of length l is formed. Since the graph is simple, $l > 1$. By Lemma 2, all of the edges in the cycle must be of equal potential cost. Therefore, each connected component will have had a tie between two frontier edges which must have been broken using the edge ordering. Therefore, either $l = 1$ or there are two edges with the same unique identifier, both of which are contradictions.

Claim 1: If all edge weights are coprime, then Proposition 1 will hold even if the unique identifier ordering assumption does not. Corollary 1 $F_o, \ldots, F_\tau$ are all acyclic.

Proof:

Since $F_o = \langle V, \emptyset \rangle$ the base case is acyclic. Induction over Proposition 1 then proves the corollary.

Let $A_f(t) = A(t)$ be an upper bound on the number of depot-less components at the beginning of round $t$. Similarly, let $L_f(t) = L(t)$ be an upper bound on the total number of components at the beginning of round $t$. Then:

$$A(t) \geq |\{C \in C_t : C \cap T = \emptyset\}|,$$

and $$L(t) \geq |C_t| \geq A(t).$$

In general, every depot-less component will union with another component during every round. Regardless of whether such a component chooses to union with a component containing a depot or one that is depot-less, the total number of components will decrease by one half the number of depot-less components. Therefore $L(t) = L(t-1) - A(t-1)/2$. Now consider the extrema for the change in the number of depot-less components. If all depot-less components choose to union with other depot-less components then $A(t) = A(t-1)/2$. On the other hand, if as many depot-less components union with components containing depots as possible, then $A(t) \leq \min(A(t-1), L(t-1) - A(t-1))$. Therefore, the general recurrences for $A(t)$ and $L(t)$ are:

$$A(t) = \max\left(\frac{A(t-1)}{2}, \min(A(t-1), L(t-1) - A(t-1))\right) \quad (1)$$

$$L(t) = L(t-1) - \frac{A(t-1)}{2}.$$

The initial conditions for the recurrences are:

$$A(0) = |\{C \in C_0 : C \cap T = \emptyset\}| = |R|,$$

$$L(0) = |C_0| = |R| + |T| = 2|R|.$$

Claim 2: $A(t-1)/2$ will always dominate in the maximization in M. X. Goemans and D. P. Williamson, "A general approximation technique for constrained forest problems," *SIAM Journal on Computing*, vol. 24, pp. 296-317, 1995. Validation of this claim will be given in the proof of the following proposition:

Proposition 2: The algorithm will terminate after a logarithmic number of rounds (i.e., iterations of the main loop on line 9 of Algorithm 1): $\tau = O(\log n)$.

Proof:

This follows from the fact that the algorithm will terminate once the number of depot-less components is zero:

$$\forall t \in \mathbb{N}^* : A(t) = 0 \Rightarrow t \geq \tau.$$

Therefore, the burden of this proof is to show that, the $A(t)$ recurrence will converge exponentially, implying that $\tau = O(\log n)$.

$$\tau = O(\log n).$$

If Claim 2 holds, then it is clear that the $A(t)$ recurrence will converge exponentially:

$$A(t) = \frac{A(0)}{2^t}$$

$$L(t) = 2|R| - \sum_{i=0}^{t} \frac{A(0)}{2^i}.$$

Let $k = \frac{A(0)}{2|R|}$ and observe that $k = \frac{1}{2}$. Substituting $2k|R|$ for $A(0)$ ensures that the minimization in $A(t)$ will always evaluate to $L(t-1) - A(t-1)$ because $$\forall t \in \mathbb{N}^* : A(t) \geq L(t) - A(t).$$

$$2|R|\frac{k}{2^t} \geq 2|R|\left(1 - \left(\sum_{i=0}^{t} \frac{k}{2^i}\right)\right) - \frac{k}{2^t}$$

$$\frac{2k}{2^t} \geq 1 - \sum_{i=0}^{k} \frac{k}{2^i}$$

$$k \geq \frac{2^t}{1 + 2^{t+1}},$$

which is true because $2^t/(1+2^{t+1})$ is bounded above by $\frac{1}{2}$. Therefore, provided Claim 2 holds, (5) can be simplified to $$A(t) = \max\left(\frac{A(t-1)}{2}, L(t-1) - A(t-1)\right).$$

Claim 2 obviously holds for the base case of $t=1$ because $A(0)/2 = 2k|R|$ is bounded below by $$L(0) - A(0) = 2|R| - \frac{2|R|}{2}.$$

Therefore, Claim 2 will hold as long as $$\frac{A(t)}{2} \geq L(t) - A(t).$$

This equates to $$k \geq 2^{t+1}\left(1 - \left(\sum_{i=0}^{t}\frac{k}{2^i}\right) - \frac{k}{2^t}\right) \geq \frac{2 \times 4^t}{2^t + 4^{t+1}},$$

which must be true because $(2 \times 4^t)/(2^t + 4^{t+1})$ is bounded above by $\frac{1}{2}$.

Claim 3: Let $t'$ be the round during which an edge $e = \langle u, v \rangle$ is added to the spanning forest. Then $e$ will not be in the cut of any component in a subsequent round:

$$\forall t > t', C \in C_t : e \notin \delta(C).$$

Proof: $\mu_{t'+1}(u) = \mu_{t'+1}(v) = \mu_{t'}(u) \cup \mu_{t'}(v)$. Therefore, in all rounds subsequent to $t'$ both endpoints of $e$ are in the same component and therefore cannot be in the frontier.

Proposition 3: The vector y is a feasible solution to D and has the property:

$$\sum_{e \in F_\tau} w(e) \le \sum_{e \in F_\tau} \sum_{S: e \in \delta(S)} y_S.$$

Proof:
The fact that y is a feasible solution to (D) is a straightforward result of the fact that y is initially zero and is updated according to (2). Let t be the round during which an edge $e = \langle u, v \rangle \in F_\tau$ was added to the forest. From (3), note that $$\left(b_t(u) = \sum_{i=0}^{t-1} y_{\mu_i(u)}\right) \wedge \left(b_t(v) = \sum_{i=0}^{t-1} y_{\mu_i(v)}\right).$$

Furthermore, at the beginning of round t the potential for e is $$\epsilon = w(e) - b_t(u) - b_t(v).$$

Once e is added to $F_t$, the dual variables $y_{\mu_t(u)}$ and $y_{\mu_t(v)}$ are updated according to (2). Then there are three possible cases:
1) $\mu_t(u) \cap T = \mu_t(v) \cap T = \emptyset$ and $J_t(u, v) = J_t(v, u)$;
2) $\mu_t(u) \cap T = \mu_t(v) \cap T = \emptyset$ and $J_t(u, v) = J_t(v, u)$; or
3) $|\mu_t(u) \cap T| + |\mu_t(v) \cap T| = 1$.

In case 1, $$y_{\mu_t(u)} + y_{\mu_t(v)} = \frac{\epsilon}{1 + J_t(v, u)} + \frac{\epsilon}{1 + J_t(u, v)} = \epsilon,$$

Implying that
$w(e) = \sum_{i=0}^{t} y_{\mu_i(u)} + y_{\mu_i(v)}$. (2) For case 2, assume without loss of generality that $J_t(u, v) = 1$ and $J_t(v, u) = 0$. For case 3, assume without loss of generality that $\mu_t(u) \cap T = \emptyset$ and $\mu_t(v) \cap T \ne \emptyset$. Then for both of these cases note that $$y_{\mu_t}(u) = \frac{\epsilon}{1 + J_t(v, u)} = \epsilon,$$

Implying that
$w(e) = y_{\mu_t(u)} + \sum_{i=0}^{t-1} y_{\mu_i(u)} + y_{\mu_i(v)}$. (3) Claim 3 implies that the summations in (6) and (7) comprise all sets that cut e, thus completing the proof.

Lemma 3: Let H be the intersection graph of the final spanning forest $F_\tau$ formed from $C_t$. Remove all isolated vertices in H that correspond to components in $C_t$ that have depots. Then no leaf in H corresponds to a component containing a depot.

Proof: This is a transcription of the proof, reproduced here for completeness using our notation in the specific domain of the Location Design and Routing Problem. Assume the contrary: Let v be a leaf, let $C_v$ be its associated component containing a depot, let e be the edge incident to v, and let $C \subseteq V$ be the component of F which contains $C_v$. Let N and C-N be the two components formed by removing edge e from the edges of component C. Without loss of generality, say that $C_v \subseteq N$. The set N-$C_v$ is partitioned by some of the components of the current round; call these $C_1, \ldots, C_k$. Since vertex v is a leaf, no edge in $F_\tau$ connects $C_v$ to any $C_i$. Thus by the construction of $F_\tau$, $\forall i \in \{1, \ldots, k\}$: $C_i$ contains at least one depot. Since $C_v$ also contains at least one depot, it follows that N must too. Clearly, if two components S and B both contain depots and $B \subseteq S$, then the component S-B must also contain a depot. Since we know that C contains a depot then N-C must as well, and thus by the construction of $F_\tau$, $e \notin F_\tau$, which is a contradiction.

It has thus far been proven that Algorithm 1 produces a feasible solution to both IP and D in a logarithmic number of rounds. It therefore only remains to bound the quality of the solution. To prove that the algorithm is a 2-approximation, a technique of defining an invariant over the weights of the edges added to the forest that can ultimately be bounded by the average vertex degree of the forest is used. The basic intuition of the result is that the average degree of a vertex in a forest of at most n vertices is at most $$2 - \frac{2}{n}.$$

This technique is exactly the same as that first used in a proof due to Goemans and Williamson in the above-referenced article (Theorem 3.6), in which they show that certain connectivity problems can be sequentially 2-approximated in polynomial time. The present result in fact generalizes that of Goemans and Williamson by proving that, with a slight change to the potential function (and thereby the invariant), the approximation guarantee can be maintained even if multiple edges are added per round (allowing for parallelism/distribution), provided that the edges are mapped to a metric space such that the maximum weight is no greater than 150% of the minimum weight.

Proposition 4: The cost of the final spanning forest $F_\tau$ is bounded above by $$\left(2 - \frac{2}{|R|}\right) Z^*_{IP}$$

if the normalized edge weights are in the range $$\left[1, \frac{3}{2}\right]$$

Proof:

Without loss of generality, assume $y_S > 0 \Rightarrow S \cap T = \emptyset$. This property ensures that $\Sigma_{S \subset V} y_S \le Z^*_{LP}$. Since it is clear that $Z^*_{LP} \le Z^*_{IP}$, we then have $$\sum_{S \subset V} y_S \le Z^*_{LP} \le Z^*_{IP}$$

Proposition 3 ensures that the weight of $F_\tau$ is $$\sum_{e \in F_\tau} w(e) \le \sum_{e \in F_\tau} \sum_{S: e \in \delta(S)} y_S = \sum_{S \subset V} y_S |F_\tau \cap \delta(S)|$$

To prove this theorem we will show by induction over the construction of $F_\tau$ that $$\sum_{S \subseteq V} y_S |F_\tau \cap \delta(S)| \le \left(2 - \frac{2}{|R|}\right) \sum_{S \subseteq V} y_S$$

(4) The base case certainly holds at round zero since all $y_S$ are initialized to zero. Let A be the set of edges added to the spanning forest during an arbitrary round t. For each edge $e = \langle u, v \rangle \in A$, let $\in_e$ denote the potential value associated with that edge: $\in_e = w(e) - b_t(u) - b_t(v)$. Now sort A according to descending potential value, such that $e_i \in A$ is edge with the $i^{th}$ largest potential. At the end of a round t, the left-hand side of (8) will increase by at most $$\sum_{C \in C_t: C \cap T \ne \emptyset} y_C |F_\tau \cap \delta(C)| = \sum_{C \in C_t: C \cap T = \emptyset} \sum_{\langle u,v \rangle \in A: u \in C} \frac{J_t(u,v) \in_e}{1 + J_t(v,u)} |F_\tau \cap \delta(C)|$$

If we can prove that this increase is bounded above by the increase of the right-hand side, namely $$\left(2 - \frac{2}{|R|}\right) \sum_{i=1}^{|A|} \in_{e_i} \times i$$

by lines 26-29 of Algorithm 1 then we will be done. First, observe that (9) can be bounded above by $$\left(\max_{e \in A} \in_e\right) \sum_{C \in C_t: C \cap T = \emptyset} \sum_{\langle u,v \rangle \in A: u \in C} J_t(u,v) |F_\tau \cap \delta(C)|$$

(5) Next, observe that (10) can be bounded below by $$\left(\min_{e \in A} \in_e\right)\left(2 - \frac{2}{|R|}\right)|A|\left(\frac{|A|}{2} + \frac{1}{2}\right) \quad (6)$$

Now let H be the intersection graph of the final spanning forest $F_\tau$ formed from $C_t$. Remove all isolated vertices in H that correspond to components in $C_t$ that contain at least one depot. Notice that H is a forest, and by Lemma 3 no leaf in H corresponds to a vertez with a depot. Let $N_\alpha$ be the set of vertices in H that correspond to depot-less components:

$$N_\alpha = \{C \in C_t : C \cap T = \emptyset\},$$

And let $N_i$ be the set of vertices in H corresponding to components with depots. The degree of a vertex v in H corresponding to component C, denoted $d_v$, must be $|\{e \in \delta(C): e \in F_\tau\}|$. Then the summation of (11) can be rewritten as $$\sum_{v \in N_\alpha} d_v = \sum_{v \in N_\alpha \cup N_i} d_v - \sum_{v \in N_i} d_v$$
$$\le 2(|N_\alpha| + |N_i| - 1) - 2|N_i|$$
$$= (2|N_\alpha| - 2).$$

This inequality holds since H is a forest with at most $|N_\alpha| + |N_i| - 1$ edges, and since each vertex corresponding to a component with a depot has degree at least 2. Substituting this result back into (11) we have $$(9) \le (11) \le \left(\max_{e \in A} \in_e\right) 2(|\{C \in C_t: C \cap T = \emptyset\}| - 1) \le \left(\max_{e \in A} \in_e\right)\left(2 - \frac{2}{|R|}\right)|A|,$$

since the number of depot-less components is always no more than $|R|$. Therefore, $(9) \le (12) \le (10)$ if during every round the following invariant holds:

$$\max_{e \in A} \in_e \le \left(\frac{|A|}{2} + \frac{1}{2}\right) \min_{e \in A} \in_e \max_{e \in A} \in_e \le \left(\frac{|A|}{2} + \frac{1}{2}\right) \max_{e \in A} \in_e,$$

which is clearly true if all of the normalized edge weights are in the range $$-\left[1, \frac{3}{2}\right].$$

Hence the theorem is proven.

As will be explained below, the parallel version of the algorithm can be trivially extended to a distributed algorithm.

Distributing the Algorithm

It is assumed that the communications network provides guaranteed delivery of messages; however, there may be arbitrary latency (i.e., the network is asynchronous). Without loss of generality, it is assumed that there is one intelligent agent per vertex in the graph. It is further assumed that all agents are honest and correct and thus need not consider the problem of Byzantine failure. The agents are non-adversarial insofar as their primary goal is to find a feasible solution to the location design and routing problem. The collective is therefore what is called a cooperative multi-agent system. Agents' perceptions of the graph being optimized (e.g., the network topology) are consistent, possibly through the use of a distributed consensus algorithm. Each agent/vertex has a unique identifier with a globally agreed ordering. This ordering can be used to construct a total ordering over the edges (e.g., by combining the unique identifiers of the incident vertices).

The proposed distributed algorithm is round-based, with each round corresponding to a single iteration of the main loop (line 9) of the parallel algorithm. The rounds proceed asynchronously between connected components. Therefore, as the connected components grow throughout the execution of the algorithm, the rounds naturally become synchronized.

The distributed version of the algorithm, given in Algorithm 2, uses simple synchronous message passing in place of the shared memory of the parallel algorithm. The distributed algorithm is proven deadlock-free in the following proposition:

Proposition 5: Algorithm 2 is Deadlock-Free.

Proof: The only blocking operations in the algorithm occur on lines 11, 14, 21, 26, and 34. Waiting for an Update message on line 11 will clearly not deadlock since UpdateRequest messages are sent on the line previous, and the procedure on line 35 immediately sends an Update message in reply to requests. Similarly, line 13 ensures that line 14 will not deadlock. The fact that the procedure on line 39 contains no blocking operations ensures that any Union message will be immediately replied with an Ack message. Therefore, line 21 will not deadlock. Any vertices that choose to make an incident edge tight will block on line 26 unless either the choice of edge was mutual or the connected component on the other end of the edge contains a depot. Let ⟨v, u⟩ be such an edge. Note that J(v, u)=1 and J(u, v)=0. In such a case, v will be added by u to I upon receipt of v's Union message on line 46. Now, by a similar argument to the proof of Lemma 2, it is noted that there must be some x and y such that $J^+(u,y)=1$ and J(y, x)=1 and either J(x, y)=1 or x's component already contains a depot (otherwise there would be a cycle). Therefore, u will not deadlock on line 26 and will eventually send an Adding message to v on line 28.

Finally, the main loop invariant on line 9 ensures that only depot-less components block on line 11. Furthermore, Equation 1 ensures that there must be exactly one vertex in each depot-less component that chooses to add exactly one edge during each round. Therefore, line 34 will not deadlock.

---

Algorithm 2 The distributed location design and routing algorithm.

1: procedure DISTRIBUTED-LOCATION-DESIGN(v, k)
Require: k is the cost of opening a depot at v.
2:     C ← ∅ / * The other frontier vertices in our component. * /
3:     N ← δ({v}) ∪ {⟨v, $d_v$⟩} / * The neighborhood of v along with the special depot vertex $d_v$ * /
4:     F ← ∅ / * The spanning forest of our component. * /
5:     w($d_v$) ← k
6:     for all i ∈ δ(C) ∪ {v} do
7:        b(i) ← 0
8:     I ← ∅
9:     while F does not contain a depot do
10:        BROADCAST-MESSAGE(UpdateRequest) to all_u ∈ N
11:        Block until we have received and handled all Update messages from N.
12:        Find an edge_e =⟨v, u⟩∈ N such that_u ∉ C and ϵ = w(e) − b(v) − b(u) is minimized.
13:        BROADCAST-MESSAGE(Potential_(ϵ)) to all c ∈ C
14:        Listen for all broadcast Potential messages from the frontier
15:        if ∈ is the smallest in the frontier and ties are broken in our favor then
16:           N ← N − {u}
17:           if u = $d_v$ then
18:              $C_m$ ← {u}
19:           else
20:              SEND-MESSAGE(Union(e)) to u
21:              Wait for an Ack_(m, $C_m$)message from u
22:              if m = Mutual then / * u also chose to make edge e tight * /
23: $$\epsilon \leftarrow \frac{\epsilon}{2}$$
24:              else
25:                 if m = Not-Mutual then / * this means u does not yet have A depot * /
26:                    Block until we have received and handled an Adding($e_a$, $\epsilon_a$, $C_a$)message from u
27:                    $C_m$ ← $C_a$
28:                    BROADCAST-MESSAGE(Adding(e, ϵ, $C_m$)) to all c ∈ C ∪ I
29:                    I ← ∅
30:                    C ← C ∪ $C_m$
31:                    b(v) ← b(v) + ϵ
32:                    F ← F ∪ {e}
33:        else
34:           Block until we have received and handled an Adding message from another frontier member
35:     procedure HANDLE-UPDATE-REQUEST-MESSAGE (UpdateRequest sent by u)
36:        Send-Message(Update(v, b(v))) to u
37:     procedure Handle-Update-Message(Update($v_u$, $b_u$)sent by u)
38:        b($v_u$) ← $b_u$
39:     procedure Handle-Union-Message(Union($e_u$)_sent by u)
40:        if_e = $e_u$ then

---

Algorithm 2 The distributed location design and routing algorithm.

41:           SEND-MESSAGE(Ack(Mutual, C))
42:        else if F already contains a depot then
43:           SEND-MESSAGE(Ack(Has − Depot, ∅))
44:        else
45:           SEND-MESSAGE(Ack(Not − Mutual, ∅))
46:           I ← I ∪ {u}
47:     procedure HANDLE-ADDING-MESSAGE(Adding($e_a$, $\epsilon_a$, $C_a$))
48:        F ← FU {$e_a$}
49:        b(v) ← b(v) + $\epsilon_a$
50:        C ← CU$C_a$

---

Assuming that all messages can be both unicast and broadcast in a constant number of messaging rounds then, by the same argument as in the proof of Equation 2, the main loop of the distributed algorithm on line 9 will run in a logarithmic number of iterations and thereby will have a logarithmic number of messaging rounds. If this assumption does not hold—for example, if ad hoc routing is required—then the algorithm can be trivially extended to support the BROADCAST-MESSAGE function itself. To do this, the algorithm will use the partially constructed spanning trees within each connected component for multicast.

The most expensive operations in the distributed algorithm are:
1. determining the frontier edge with minimal potential; and
2. merging two connected components once an edge between them becomes tight. Should efficient broadcast be unavailable, one way of implementing these operations is to have broadcast messages convergecasted up the partially constructed spanning tree in the component. The root of the tree (e.g., the vertex that was added the earliest and is of highest unique identifier) can then perform the operation and unicast the result back down to the relevant frontier member(s).

The distributed algorithm described herein for the location design and routing problem is guaranteed to run in a logarithmic number of communication rounds. Provided that the weight of the heaviest edge added in a round is no more than 150% of the lightest edge, the algorithm is guaranteed to produce a solution whose cost is no worse than two times optimal. This invariant can be maintained in general by embedding the true edge weights into $$\left[1, \frac{3}{2}\right] \in \mathbb{Q}.$$

Empirical results suggest that the algorithm as described herein will in fact produce 2-optimal solutions for arbitrary edge weight distributions. Ultimately, the algorithm furthers the results of Panconesi (mentioned herein) by showing that the primal/dual optimization scheme proposed in M. X. Goemans and D. P. Williamson, "A general approximation technique for constrained forest problems," *SIAM Journal on Computing*, vol. 24, pp. 296-317, 1995, can be successfully distributed into an algorithm with not only bounds on approximation, but also on runtime. This suggests that other connectivity problems might yield to the same approach.

Algorithm Implementation

Figure 4:
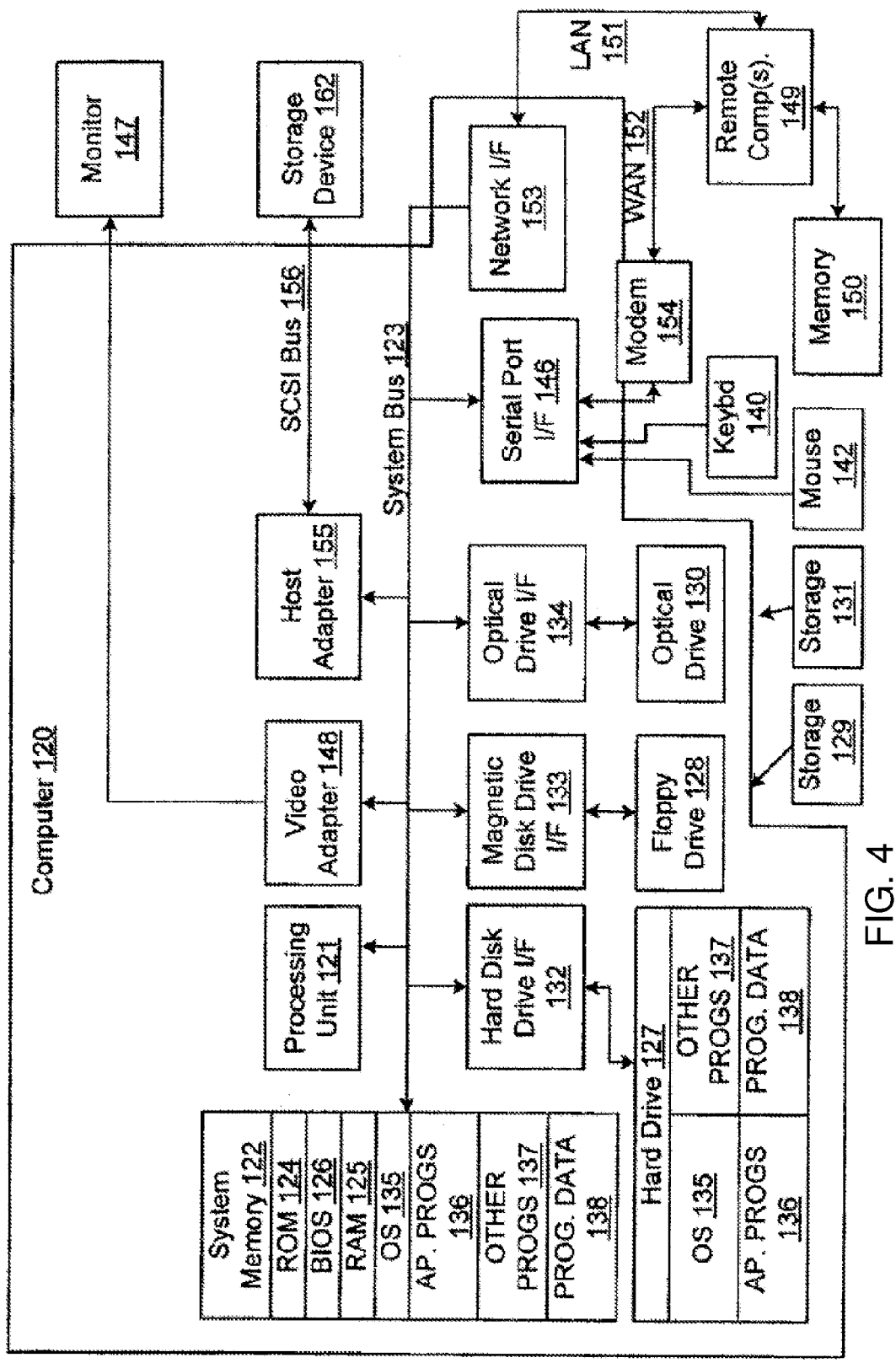
FIG. 4 is a block diagram representing a general purpose computer system in which aspects of the present invention may be incorporated.

FIG. 4 and the following discussion are intended to provide a brief general description of a suitable computing environment in which the algorithms described above may be implemented. Although not required, the algorithms above may be implemented as computer-executable instructions, such as program modules, that are executed by a computer, such as a client workstation, server or personal computer, to implement methods of locating and routing nodes, for example. Generally, computer-executable instructions include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

FIG. 4 is a block diagram representing a general purpose computer system in which aspects of the present invention may be incorporated. As shown, the exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video or versatile disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 4 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 4. The logical connections depicted in FIG. 4 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Computer 120 typically includes a variety of computer readable storage media. Computer readable storage media can be any available media that can be accessed by computer 120 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 120. Combinations of any of the above should also be included within the scope of computer readable media that may be used to store source code for implementing the algorithms described above when such source code is executed by a processor.

The invention is not intended to be limited to the variations and examples specifically mentioned, and accordingly reference should be made to the appended claims to assess the spirit and scope of the invention in which exclusive rights are claimed.

What is claimed:

1. A computer-implemented method of identifying nodes or distribution centers for decentralized distribution of information or materials throughout a network or throughout a geographic area, comprising:
   (a) starting with an empty forest of potential nodes or distribution centers of said network or said geographic area, a computer assigning each potential node or distribution center of the forest to be a member of its own connected component;
   (b) for each potential node or distribution center that has not yet been assigned to be a node or distribution center, the computer adding a cut edge of a connected component to the forest and merging the cut edge with a potential node or distribution center on the other end of the cut edge;
   (c) when a potential node or distribution center is merged with another potential node or distribution center that has been assigned to a node or distribution center, the computer assigning the same node or distribution center to the potential node or distribution center and stopping a resulting merged node from actively growing;
   (d) the computer repeating steps (a)-(c) until all potential nodes or distribution centers have been assigned to a node or distribution center and each connected component has at least one distribution center for distribution of said information or materials to other nodes in said each connected component;
   wherein each potential node or distribution center has a unique identifier with a globally agreed ordering, the processor further implementing the step of using the unique identifiers of potential nodes or distribution centers to construct a total ordering over the cut edges of the connected components by combining unique identifiers of incident potential nodes or distribution center.

2. The method of claim 1, wherein the computer proceeds asynchronously between respective connected components of the forest of potential nodes or distribution centers.

3. The method of claim 1, wherein the cut edges of the connected components have different weightings.

4. The method of claim 1, wherein the computer performs steps (a)-(c) for a connected component and repeats steps (a)-(c) asynchronously for respective connected components.

5. A computer system including a memory and a processor programmed by executable instructions to implement a method of identifying nodes or distribution centers for decentralized distribution of information or materials throughout a network or throughout a geographic area, the executable instructions when processed by the processor implementing the steps of:
   (a) starting with an empty forest of potential nodes or distribution centers of said network or said geographic area, assigning each potential node or distribution center of the forest to be a member of its own connected component;
   (b) for each potential node or distribution center that has not yet been assigned to be a node or distribution center, adding a cut edge of a connected component to the forest and merging the cut edge with a potential node or distribution center on the other end of the cut edge;
   (c) when a potential node or distribution center is merged with another potential node or distribution center that has been assigned to a node or distribution center, assigning the same node or distribution center to the potential node or distribution center and stopping a resulting merged node from actively growing;
   (d) repeating steps (a)-(c) until all potential nodes or distribution centers have been assigned to a node or distribution center and each connected component has at least one distribution center for distribution of said information or materials to other nodes in said each connected component;
   wherein each potential node or distribution center has a unique identifier with a globally agreed ordering, further comprising instructions that when executed by said processor cause said processor to implement the step of using the unique identifiers of potential nodes or distribution centers to construct a total ordering over the cut edges of the connected components by combining unique identifiers of incident potential nodes or distribution center.

6. The computer system of claim 5, wherein the processor is further programmed by executable instructions to proceed asynchronously between respective connected components of the forest of potential nodes or distribution centers.

7. The computer system of claim 5, wherein the cut edges of the connected components have different weightings.

8. The computer system of claim 5, wherein the processor performs steps (a)-(c) for a connected component and repeats steps (a)-(c) asynchronously for respective connected components.

9. A non-transitory computer readable storage medium having executable instructions stored thereon that when executed by a processor cause said processor to implement a method of identifying nodes or distribution centers for decentralized distribution of information or materials throughout a network or throughout a geographic area, the method comprising the steps of:
   (a) starting with an empty forest of potential nodes or distribution centers of said network or said geographic area, assigning each potential node or distribution center of the forest to be a member of its own connected component;
   (b) for each potential node or distribution center that has not yet been assigned to be a node or distribution center, adding a cut edge of a connected component to the forest and merging the cut edge with a potential node or distribution center on the other end of the cut edge;
   (c) when a potential node or distribution center is merged with another potential node or distribution center that has been assigned to a node or distribution center, assigning the same node or distribution center to the potential node or distribution center and stopping a resulting merged node from actively growing;
   (d) repeating steps (a)-(c) until all potential nodes or distribution centers have been assigned to a node or distribution center and each connected component has at least one distribution center for distribution of said information or materials to other nodes in said each connected component;
   wherein each potential node or distribution center has a unique identifier with a globally agreed ordering, further comprising instructions that when executed by said processor cause said processor to implement the step of using the unique identifiers of potential nodes or distribution centers to construct a total ordering over the cut edges of the connected components by combining unique identifiers of incident potential nodes or distribution center.

10. The storage medium of claim 9, wherein the processor proceeds asynchronously between respective connected components of the forest of potential nodes or distribution centers.

11. The storage medium of claim 9, wherein the cut edges of the connected components have different weightings.

12. The storage medium of claim 9, wherein the processor performs steps (a)-(c) for a connected component and repeats steps (a)-(c) asynchronously for respective connected components.

* * * * *